US008112096B2

(12) United States Patent
Mazlum et al.

(10) Patent No.: US 8,112,096 B2
(45) Date of Patent: Feb. 7, 2012

(54) SYSTEM AND METHOD FOR LOCATING AN UNKNOWN BASE STATION

(75) Inventors: Selcuk Mazlum, Leesburg, VA (US); Tariqul Islam, Germantown, MD (US)

(73) Assignee: Andrew, LLC, Hickory, NC (US)

( * ) Notice: Subject to any disclaimer, the term of this patent is extended or adjusted under 35 U.S.C. 154(b) by 525 days.

(21) Appl. No.: 12/250,910

(22) Filed: Oct. 14, 2008

(65) Prior Publication Data
US 2009/0131075 A1 May 21, 2009

Related U.S. Application Data

(60) Provisional application No. 60/996,412, filed on Nov. 15, 2007.

(51) Int. Cl.
*H04W 24/00* (2009.01)
(52) U.S. Cl. ............... 455/456.1; 455/456.5; 455/456.6
(58) Field of Classification Search ............ 455/67.11, 455/69, 404.2, 418, 422.1, 423–425, 457, 455/456.1–456.6, 524–527, 550.1, 556.2, 455/561, 517; 370/328, 350
See application file for complete search history.

(56) References Cited

U.S. PATENT DOCUMENTS

| | | | |
|---|---|---|---|
| 3,150,372 A | 9/1964 | Groth, Jr. | |
| 3,659,085 A | 4/1972 | Potter et al. | |
| 4,728,959 A | 3/1988 | Maloney | |
| 4,814,751 A | 3/1989 | Hawkins | |
| 4,845,504 A | 7/1989 | Roberts et al. | |
| 4,891,650 A | 1/1990 | Sheffer | |
| 5,056,106 A | 10/1991 | Wang | |
| 5,218,618 A | 6/1993 | Sagey | |
| 5,245,634 A | 9/1993 | Averbuch | |
| 5,317,323 A | 5/1994 | Kennedy et al. | |
| 5,327,144 A | 7/1994 | Stilp et al. | |
| 5,365,544 A | 11/1994 | Schilling | |
| 5,372,144 A | 12/1994 | Mortier et al. | |
| 5,404,376 A | 4/1995 | Dent | |
| 5,423,067 A | 6/1995 | Manabe | |
| 5,465,289 A | 11/1995 | Kennedy | |
| 5,506,863 A | 4/1996 | Meidan et al. | |
| 5,506,864 A | 4/1996 | Schilling | |
| 5,508,708 A | 4/1996 | Ghosh et al. | |

(Continued)

OTHER PUBLICATIONS

International Searching Authority, International Search Report for International Application No. PCT/US08/60120 (foreign counterpart of cross-referenced application), mailed Jun. 30, 2008, p. 1-2.
International Searching Authority, International Search Report for International Application No. PCT/US08/60109 (foreign counterpart of cross-referenced application), mailed Jun. 30, 2008, p. 1-2.

*Primary Examiner* — Meless Zewdu
(74) *Attorney, Agent, or Firm* — Duane Morris, LLP

(57) ABSTRACT

A system and method for estimating a location of an unknown Node B in a wireless communication system having a plurality of other nodes and a plurality of location measurement units. A first value may be determined based on a network timing characteristic for one of the nodes, and a second value may be determined based on a network measurement report characteristic from a user equipment ("UE"). An observed time difference of arrival ("OTDOA") hyperbola may then be calculated based on the first and second values, and a location of the unknown Node B as a function of the OTDOA hyperbola. Therefore, through the combination of a UE network measurement report characteristic and a downlink timing measurement from a location measurement unit, the location of an unknown Node B may be determined.

45 Claims, 11 Drawing Sheets

U.S. PATENT DOCUMENTS

| | | |
|---|---|---|
| 5,512,908 A | 4/1996 | Herrick |
| 5,515,419 A | 5/1996 | Sheffer |
| 5,519,760 A | 5/1996 | Borkowski et al. |
| 5,559,864 A | 9/1996 | Kennedy |
| 5,592,180 A | 1/1997 | Yokev et al. |
| 5,608,410 A | 3/1997 | Stilp et al. |
| 5,614,914 A | 3/1997 | Bolgiano et al. |
| 5,675,344 A | 10/1997 | Tong et al. |
| 5,736,964 A | 4/1998 | Ghosh et al. |
| 5,815,538 A | 9/1998 | Grell et al. |
| 5,825,887 A | 10/1998 | Lennen |
| 5,870,029 A | 2/1999 | Otto et al. |
| 5,920,278 A | 7/1999 | Tyler et al. |
| 5,952,969 A | 9/1999 | Hagerman et al. |
| 5,959,580 A | 9/1999 | Maloney et al. |
| 5,960,341 A | 9/1999 | LeBlanc et al. |
| 5,973,643 A | 10/1999 | Hawkes et al. |
| 5,987,329 A | 11/1999 | Yost |
| 6,014,102 A | 1/2000 | Mitzlaff et al. |
| 6,047,192 A | 4/2000 | Maloney |
| 6,091,362 A | 7/2000 | Stilp |
| 6,097,336 A | 8/2000 | Stilp |
| 6,097,959 A | 8/2000 | Yost |
| 6,101,178 A | 8/2000 | Beal |
| 6,108,555 A | 8/2000 | Maloney et al. |
| 6,115,599 A | 9/2000 | Stilp |
| 6,119,013 A | 9/2000 | Maloney et al. |
| 6,127,975 A | 10/2000 | Maloney |
| 6,144,711 A | 11/2000 | Raleigh et al. |
| 6,172,644 B1 | 1/2001 | Stilp |
| 6,184,829 B1 | 2/2001 | Stilp |
| 6,188,351 B1 | 2/2001 | Bloebaum |
| 6,191,738 B1 | 2/2001 | Pfeil et al. |
| 6,201,499 B1 | 3/2001 | Hawkes et al. |
| 6,201,803 B1 | 3/2001 | Munday et al. |
| 6,212,319 B1 | 4/2001 | Cayrefourcq |
| 6,233,459 B1 | 5/2001 | Sullivan et al. |
| 6,246,884 B1 | 6/2001 | Karmi et al. |
| 6,266,013 B1 | 7/2001 | Stilp et al. |
| 6,281,834 B1 | 8/2001 | Stilp |
| 6,285,321 B1 | 9/2001 | Stilp et al. |
| 6,288,675 B1 | 9/2001 | Maloney |
| 6,288,676 B1 | 9/2001 | Maloney |
| 6,295,455 B1 | 9/2001 | Fischer et al. |
| 6,311,043 B1 | 10/2001 | Haardt et al. |
| 6,317,081 B1 | 11/2001 | Stilp |
| 6,317,604 B1 | 11/2001 | Kovach, Jr. et al. |
| 6,334,059 B1 | 12/2001 | Stilp et al. |
| 6,351,235 B1 | 2/2002 | Stilp |
| 6,366,241 B2 | 4/2002 | Pack |
| 6,388,618 B1 | 5/2002 | Stilp et al. |
| 6,400,320 B1 | 6/2002 | Stilp et al. |
| 6,407,703 B1 | 6/2002 | Minter et al. |
| 6,463,290 B1 | 10/2002 | Stilp et al. |
| 6,470,195 B1 | 10/2002 | Meyer |
| 6,477,161 B1 | 11/2002 | Hudson |
| 6,483,460 B2 | 11/2002 | Stilp et al. |
| 6,492,944 B1 | 12/2002 | Stilp |
| 6,501,955 B1 | 12/2002 | Durrant et al. |
| 6,519,465 B2 | 2/2003 | Stilp et al. |
| 6,522,890 B2 * | 2/2003 | Drane et al. ............... 455/456.5 |
| 6,546,256 B1 | 4/2003 | Maloney |
| 6,553,322 B1 | 4/2003 | Ignagni |
| 6,563,460 B2 | 5/2003 | Stilp et al. |
| 6,571,082 B1 | 5/2003 | Rahman |
| 6,603,428 B2 | 8/2003 | Stilp |
| 6,603,761 B1 | 8/2003 | Wang |
| 6,640,106 B2 | 10/2003 | Gutowski et al. |
| 6,646,604 B2 | 11/2003 | Anderson |
| 6,661,379 B2 | 12/2003 | Stilp et al. |
| 6,765,531 B2 | 7/2004 | Anderson |
| 6,771,625 B1 | 8/2004 | Beal |
| 6,771,969 B1 | 8/2004 | Chinoy |
| 6,782,264 B2 | 8/2004 | Anderson |
| 6,834,234 B2 | 12/2004 | Scherzinger et al. |
| 6,839,539 B2 | 1/2005 | Durrant et al. |
| 6,845,240 B2 | 1/2005 | Carlson et al. |
| 6,859,172 B2 | 2/2005 | Powers et al. |
| 6,871,077 B2 | 3/2005 | Kennedy, Jr. |
| 6,873,290 B2 | 3/2005 | Anderson et al. |
| 6,876,859 B2 | 4/2005 | Anderson et al. |
| 6,920,329 B2 | 7/2005 | Kennedy, Jr. et al. |
| 6,922,170 B2 | 7/2005 | Alexander, Jr. |
| 6,952,158 B2 | 10/2005 | Kennedy, Jr. |
| 6,987,979 B2 | 1/2006 | Carlsson |
| 6,996,392 B2 | 2/2006 | Anderson |
| 7,023,383 B2 | 4/2006 | Stilp et al. |
| 7,089,021 B2 * | 8/2006 | Beckmann et al. ......... 455/456.2 |
| 7,127,257 B2 | 10/2006 | Riley et al. |
| 7,155,244 B2 | 12/2006 | Edge |
| 7,167,713 B2 | 1/2007 | Anderson |
| 7,203,503 B2 * | 4/2007 | Cedervall et al. .......... 455/456.5 |
| 7,271,765 B2 | 9/2007 | Stilp et al. |
| 7,315,745 B2 | 1/2008 | Duffett-Smith et al. |
| 7,340,259 B2 | 3/2008 | Maloney |
| 7,346,345 B2 * | 3/2008 | Ruutu et al. .................. 455/423 |
| 7,383,049 B2 | 6/2008 | Deloach, Jr. et al. |
| 7,427,952 B2 | 9/2008 | Bull et al. |
| 7,433,321 B2 * | 10/2008 | Grilli et al. .................... 370/252 |
| 7,440,762 B2 | 10/2008 | Maloney et al. |
| 7,593,738 B2 | 9/2009 | Anderson |
| 2002/0077116 A1 | 6/2002 | Havinis et al. |
| 2002/0172223 A1 | 11/2002 | Stilp et al. |
| 2003/0064734 A1 | 4/2003 | Stilp et al. |
| 2003/0139188 A1 | 7/2003 | Chen et al. |
| 2003/0148774 A1 | 8/2003 | Naghian et al. |
| 2003/0190919 A1 | 10/2003 | Niemenmaa |
| 2003/0203738 A1 | 10/2003 | Brown et al. |
| 2003/0216142 A1 * | 11/2003 | Wigren ....................... 455/456.1 |
| 2004/0037246 A1 | 2/2004 | Grilli et al. |
| 2004/0043775 A1 | 3/2004 | Kennedy, Jr. et al. |
| 2004/0087277 A1 | 5/2004 | Edge et al. |
| 2004/0132464 A1 | 7/2004 | Poykko et al. |
| 2004/0132466 A1 | 7/2004 | Kennedy, Jr. et al. |
| 2004/0180645 A1 | 9/2004 | Bussan et al. |
| 2004/0180671 A1 | 9/2004 | Spain |
| 2004/0203921 A1 | 10/2004 | Bromhead et al. |
| 2004/0218664 A1 | 11/2004 | Kennedy, Jr. et al. |
| 2004/0252752 A1 | 12/2004 | Kennedy, Jr. et al. |
| 2005/0058182 A1 | 3/2005 | Kennedy, Jr. et al. |
| 2005/0136945 A1 | 6/2005 | Kennedy, Jr. et al. |
| 2005/0164712 A1 | 7/2005 | Kennedy, Jr. et al. |
| 2005/0192026 A1 | 9/2005 | Carlson et al. |
| 2006/0003695 A1 | 1/2006 | Kennedy, Jr. et al. |
| 2006/0003775 A1 | 1/2006 | Bull et al. |
| 2006/0030333 A1 | 2/2006 | Ward et al. |
| 2006/0116130 A1 | 6/2006 | Kennedy, Jr. et al. |
| 2006/0125695 A1 | 6/2006 | Kennedy, Jr. et al. |
| 2006/0141998 A1 | 6/2006 | Kennedy, Jr. et al. |
| 2006/0154607 A1 | 7/2006 | Kennedy, Jr. et al. |
| 2006/0239391 A1 | 10/2006 | Flanagan |
| 2006/0240836 A1 | 10/2006 | Kennedy, Jr. et al. |
| 2007/0087689 A1 | 4/2007 | Kennedy, Jr. et al. |
| 2007/0111746 A1 | 5/2007 | Anderson et al. |
| 2007/0155401 A1 | 7/2007 | Ward et al. |
| 2007/0155489 A1 | 7/2007 | Beckley et al. |
| 2007/0202885 A1 | 8/2007 | Kennedy, Jr. et al. |
| 2008/0096566 A1 * | 4/2008 | Brunner et al. ............... 455/437 |
| 2008/0132244 A1 | 6/2008 | Anderson et al. |
| 2008/0132247 A1 | 6/2008 | Anderson et al. |
| 2008/0137524 A1 | 6/2008 | Anderson et al. |
| 2008/0158059 A1 | 7/2008 | Bull et al. |
| 2008/0160952 A1 | 7/2008 | Bull et al. |
| 2008/0160953 A1 | 7/2008 | Mia et al. |
| 2008/0161015 A1 | 7/2008 | Maloney et al. |
| 2008/0248811 A1 | 10/2008 | Maloney et al. |
| 2008/0261611 A1 | 10/2008 | Mia et al. |
| 2008/0261612 A1 | 10/2008 | Mia et al. |
| 2008/0261613 A1 | 10/2008 | Anderson et al. |
| 2008/0261614 A1 | 10/2008 | Mia et al. |
| 2009/0005061 A1 | 1/2009 | Ward et al. |

* cited by examiner

610
Determine first and second values based on a network timing characteristic

620
Calculate OTDOA

630
Estimate location of unknown Node B

*Fig. 6*

SYSTEM AND METHOD FOR LOCATING AN UNKNOWN BASE STATION

RELATED APPLICATIONS

The instant application is co-pending with and claims the priority benefit of Provisional application No. 60/996,412, filed Nov. 15, 2007, entitled "Locating UMTS UE Using Measurement Reports," by the same inventors, the entirety of which is incorporated herein by reference.

The instant application is co-pending with and related to U.S. application Ser. No. 11/749,095, filed May 15, 2007, entitled "System and Method for Estimating the Location of a Mobile Station in Communications Networks," the entirety of which is incorporated herein by reference. The instant application is co-pending with and related to U.S. application Ser. No. 11/749,101, filed May 15, 2007, entitled "System and Method for Network Timing Recovery in Communications Networks," the entirety of which is incorporated herein by reference. The instant application is co-pending with and related to U.S. application Ser. No. 12/104,250, filed Apr. 16, 2008, entitled "System and Method for Locating UMTS User Equipment Using Measurement Reports," the entirety of which is incorporated herein by reference.

BACKGROUND

Regarding the location of base stations in a communications network, many security or commercial applications rely on the precise knowledge of the locations of base stations in a communications network. Generally, network operators are involved with the set up of these commercial applications, and the locations of the base stations are known in advance. There may be cases, however, where the network operators are not cooperative. There may also be cases, e.g., for security applications, where these applications are used without the knowledge of the network operators. There is also a need in the art for automatically adding the location of a base station and associated information with the base station to a database when a new base station is installed in a network. For example, co-pending U.S. patent application Ser. No. 12/104, 250, filed Apr. 16, 2008, entitled "System and Method for Locating UMTS User Equipment Using Measurement Reports," the entirety of which is incorporated herein by reference, discusses determining the location of user equipment ("UE") assuming that the locations of base stations in a measurement report are known. If such is not the case, then the methods described in embodiments of the present subject matter may be utilized to determine the locations of unknown or newly installed base stations or Node Bs, and then the location of a UE determined.

It is known that any electromagnetic wave emitting object may be located by utilizing sensors that receive the waves combined with an a geolocation process such as triangulation, multilateration, AOA, etc. In several networks, operators have installed location measurement units ("LMUs") therein which may be utilized as sensors for these processes. If multilateration (i.e., TDOA positioning) is utilized then at least four LMUs are generally required resulting in three independent hyperbolas. The intersection point of these three hyperbolas may be the estimated location of the unknown base station or Node B. In some cases, however, these hyperbolas may not intersect exactly at one point, and a more accurate location may be determined based on the LMU geometry, received signal quality, etc.

Embodiments of the present subject matter therefore provide a novel method and system to derive OTDOA information from the existing mobile devices and base stations utilizing messages typically used for normal operation of the mobile device. For example, measurement report messages, e.g., network measurement reports, are generally utilized for managing handover. UMTS mobile devices report these messages to a base station for proper operation. These messages contain the Connection Frame Number ("CFN")—System Frame Number ("SFN") information between serving and neighbor nodes, such as, but not limited to, base stations, base station sectors, cells, etc. Embodiments of the present subject matter may also derive a neighboring node's SFN-SFN OTD from this information. Moreover, if the neighboring SFN times are known, OTDOAs of the neighboring node downlink may be determined. Embodiments of the present subject matter may therefore make it possible to determine downlink OTDOA values for mobile devices that do not support the OTDOA feature through the exploitation of network measurement reports that are generally not intended for location determination.

Accordingly, there is a need for a method and system for locating an unknown base station or Node B using measurement reports and for generating location determining hyperbolas by combining a UE measurement report with LMU measurements. Therefore, an embodiment of the present subject matter provides a method for estimating a location of an unknown Node B in a wireless communications system having a plurality of known nodes. The method may comprise determining an OTDOA hyperbola based on signals received from the unknown Node B and one of the known nodes. The OTDOA hyperbola may be determined using information received from a user equipment network measurement report, the user equipment being at any known location.

Another embodiment of the present subject matter may provide a method for estimating a location of an unknown Node B in a wireless communication system having a plurality of other nodes and a plurality of LMUs. The method may comprise determining first and second values based on a network timing characteristic for ones of the nodes. An OTDOA hyperbola may be calculated based on the first and second values, and a location of the unknown Node B determined as a function of the OTDOA hyperbola.

A further embodiment of the present subject matter may provide another method for estimating a location of an unknown Node B in a wireless communication system having a plurality of other nodes and a plurality of LMUs. The method may comprise determining a first value based on a network measurement report characteristic, a second value based on a first network timing characteristic, a third value based on a second network timing characteristic, and a fourth value based on a third network timing characteristic. An OTDOA hyperbola may be calculated based on at least one of the first, second, third, or fourth values, and a location of the unknown Node B estimated as a function of the OTDOA hyperbola.

An additional embodiment of the present subject may provide a further method for estimating a location of an unknown Node B in a wireless communication system having a plurality of other nodes and a plurality of LMUs. The method may comprise determining a first value based on a first network measurement report characteristic, a second value based on a second network measurement report characteristic, a third value based on a first network timing characteristic, and a fourth value based on a second network timing characteristic. An OTDOA hyperbola may be calculated based on at least one of the first, second, third, or fourth values, and a location of the unknown Node B estimated as a function of the OTDOA hyperbola.

Another embodiment of the present subject matter may provide an additional method for estimating a location of an unknown Node B in a wireless communication system having a plurality of other nodes and a plurality of LMUs. The method may comprise determining a first value based on a first network measurement report characteristic, a second value based on a second network measurement report characteristic, a third value based on a third network measurement report characteristic, and a fourth value based on a network timing characteristic. An OTDOA hyperbola may be calculated based on at least one of the first, second, third, or fourth values, a location of the unknown Node B estimated as a function of the OTDOA hyperbola.

One embodiment of the present subject matter may provide a system for estimating a location of an unknown Node B in a wireless communication system having a plurality of other nodes and a plurality of LMUs. The system may comprise circuitry for determining a first value based on a network timing characteristic for one of the nodes and circuitry for determining a second value based on a network measurement report characteristic. The system may also include circuitry for calculating an OTDOA hyperbola based on the first and second values and circuitry for estimating a location of said unknown Node B as a function of said OTDOA hyperbola.

Another embodiment of the present subject matter provides a method for estimating a location of an unknown Node B in a wireless communication system having a plurality of other nodes and a plurality of LMUs. The method may include determining a first value based on a first network timing characteristic of the unknown Node B at a first LMU and determining a second value based on a second network timing characteristic of the unknown Node B at a second LMU. One or more OTDOA hyperbolas may be calculated based on at least the first and second values. A third value based may be determined on a third network timing characteristic of a known Node B at one of said first or second LMUs. A first timing offset value between the known and unknown Node Bs may be determined as a function of any one or combination of the first, second and third values, and a second timing offset value between the known and unknown Node Bs determined using a UE network measurement report. A propagation delay from the known Node B to the LMU or UE may be determined as a function of the timing offset values, and one or more OTDOA hyperbolas calculated based on ones of the first timing offset value, second timing offset value, third value, and propagation delay. A location of the unknown Node B may then be estimated as a function of said OTDOA hyperbolas.

These embodiments and many other objects and advantages thereof will be readily apparent to one skilled in the art to which the invention pertains from a perusal of the claims, the appended drawings, and the following detailed description of the embodiments.

BRIEF DESCRIPTION OF THE DRAWINGS

FIG. 6 is an algorithm according to an embodiment of the present subject matter.

DETAILED DESCRIPTION

Figure 1:
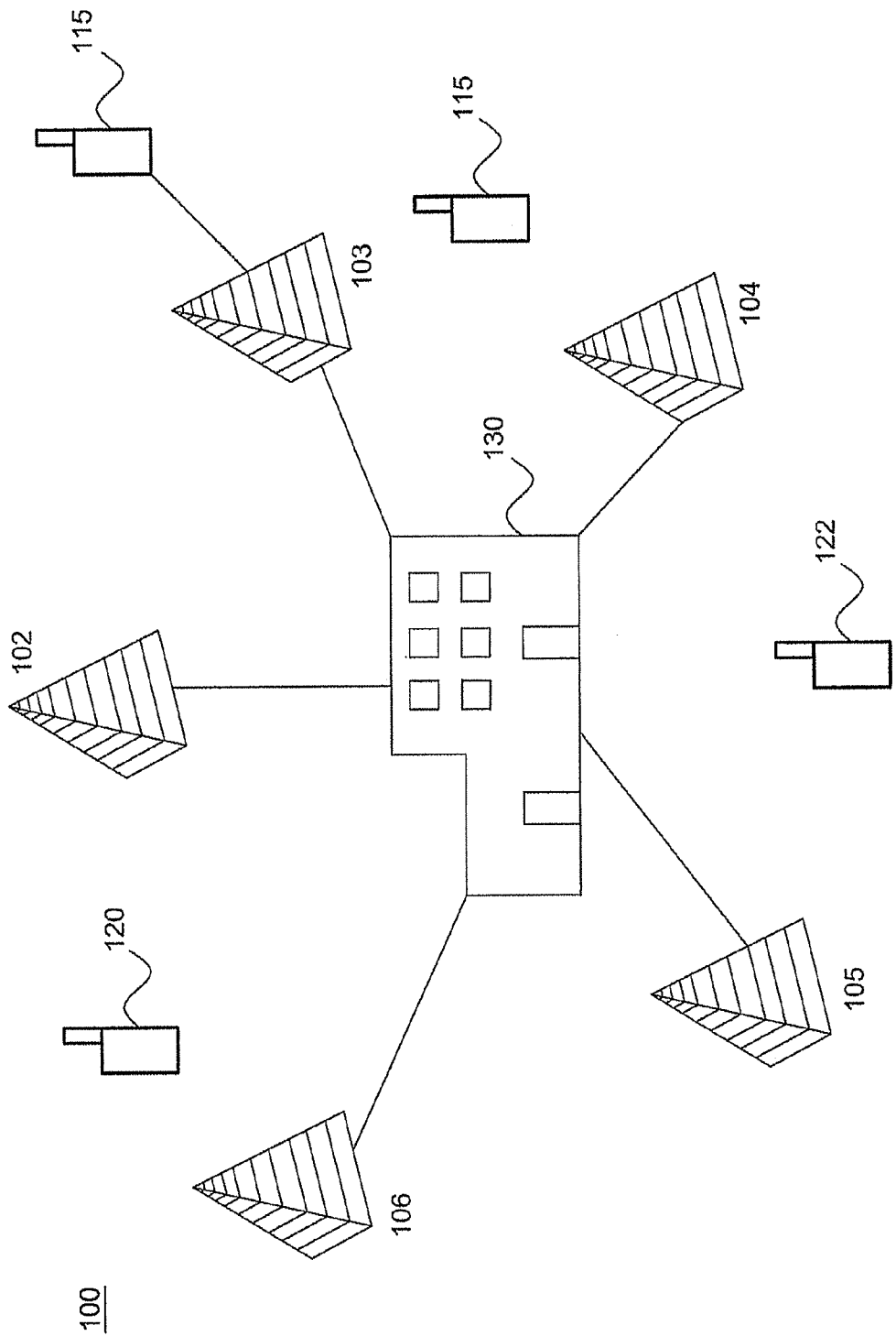
FIG. 1 is an illustration of a wireless communications network according to an embodiment of the present subject matter.

With reference to the figures where like elements have been given like numerical designations to facilitate an understanding of the present subject matter, the various embodiments of a system and method for locating an unknown base station are herein described. It should be noted that the terms "device," "handset," "unit" and "station" are utilized interchangeably through the present disclosure and such use is not intended to limit the scope of the claims appended herewith. Further, it should also be noted that the terms "node," "cell," and "station" are also utilized interchangeably through the present disclosure and such use is not intended to limit the scope of the claims appended herewith.

Embodiments of the present subject matter may provide several methods to derive timing information. Thus, once the timing relationships are known, the positions of the same mobile device, other mobile devices, or base stations may be determined completely, or partly, from calculated hyperbolas, from observed time differences ("OTDs"), or from other values. Timing relationships may tend to drift over time as a function of oscillator characteristics utilized in respective base stations. This drift must be accounted for when utilizing these methods, either through periodic updating of the estimated base station time relationships (base station timing offsets or "BSTOs") or through known means to track and predict timing relationships via prediction methods based on past measurement timing trends. Exemplary means of prediction are well-known in the industry and are a manageable problem to those skilled in the art, and will thus not be the subject of further discussion herein.

OTDs generally define a set of handset based measurements known in the 3GPP standard such as System Frame Number "SFN-SFN" Type 1 and/or Type 2. These measurements are generally the observed time difference of two nodes such as base station cells or sectors and differ primarily in the timing resolution of the measurements. For example, with Type 1, a mobile device measures the timing difference between the Primary Common Control Physical Channels ("P-CCPCH") of cell 1 and cell 2. Type 1 is generally available on a CELL_FACH connection. While a soft handover cannot be performed while on a CELL_FACH connection, the network may request the mobile device to measure the timing difference between cell 1 and cell 2. While on a CELL_ FACH connection, a Measurement Control Message may be sent to the mobile device on the Forward Access Channel ("FACH"), and the mobile device's measurement results are returned on the Reverse Access Channel ("RACH"). With Type 2, the mobile device measures the timing difference between the Common Pilot Channels ("CPICH") of cell 1 and cell 2. Type 2 is applicable to both CELL_DCH and CELL_FACH connections. With either connection type, if there is power in cell 2, the mobile may measure the timing difference between the two cells. While on a CELL_DCH connection, the mobile device may measure OTDs while in soft handover with cells 1 and 2. Another set of handset based measurements known in the 3GPP standard is SFN-Connection Frame Number ("CFN"). These measurements refer to the observed time difference between the connection to a current serving base station cell and some set of handset-measurable, neighboring cells or sectors.

One solution to obtain a cell or node's SFN timing may be to synchronize the respective base stations with GPS or other comparable techniques. If network carriers find this option justifiable, then network synchronization units ("NSUs") may not be necessary. When base stations are not synchronized, the techniques described in co-pending U.S. application Ser. No. 11/749,095 and co-pending U.S. application Ser. No. 11/749,101, both filed May 15, 2007, the entirety of each incorporated herein by reference, may be utilized. While an NSU based method is described below, such an example should not in any way limit the scope of the claims appended herewith.

One NSU based solution may provide a GPS trained NSU at one or more base stations within a communications network. The NSU may have knowledge of the co-located site's scrambling code and may also continuously estimate the timing of the downlink frame marker. When embodiments of the present subject matter employ chip offset (0-38399) information of the rounded frame and chip offset term in the network measurement report, absolute SFN timing within 256 frames may not be required. Therefore, knowledge of frame timing markers (having a period of 38400 chips (10 ms)) may generally be adequate for this purpose. In one embodiment of the present subject matter, SFN timing information may be maintained in a timing bank to provide accurate timing relationships of neighbor SFNs at appropriate measurement reporting times. Of course, embodiments of the present subject matter employed in OFDMA based systems utilize sampling time as the time unit. In such OFDMA based systems the timing offset would be a sample offset rather than a chip offset. Therefore, chip offset, timing offset, sample offset may be utilized interchangeably throughout the present disclosure and the use of one term without the others should not in any way limit the scope of the claims appended herewith. As embodiments of the present subject matter are not directly dependent of SFN, these certain embodiments may be employed in systems operating under the Long Term Evolution ("LTE") standard, by way of a non-limiting example, and frame offset or frame marker offset would be equally applicable thereto. Therefore, SFN, frame offset, and frame marker offset may be utilized interchangeably throughout the present disclosure and the use of one term without the others should not in any way limit the scope of the claims appended herewith.

Another embodiment of the present subject matter may employ a sparse deployment of NSUs to reduce hardware deployment cost and track SFN timing. For example, a GPS trained NSU, preferably within line of sight of one or more base stations and positioned at a known location, may measure the timing of several scrambling codes associated with one or more neighboring cells or nodes. With knowledge of the precise location of several base stations and the NSU, SFN timing at the neighboring sites may then be determined. Further, as some of the downlink signals may be detected at multiple NSUs, multipath may also be resolved by selecting the earliest SFN timing of a base station.

Multiples of 256 chips timing offset between different sectors of a base station may assist in identifying the scrambling code group of a base station. However, when the grouping of the scrambling code is known, the modulo 256 chip timing offset characteristics may assist in determining the SFN timing for co-located sectors if the timing of only one sector is known. This latter technique may, of course, be utilized for sparse NSU deployments.

In another embodiment of the present subject matter, the sparse NSU deployment approach may be useful in locating unknown base stations. For example, where the location of one or more base stations is not readily available from the carrier, the downlink of a particular base station may be detected at multiple NSU sites, and the base station may then be located with the downlink TDOA information.

FIG. 1 is an illustration of an exemplary wireless communications network according to an embodiment of the present subject matter. With reference to FIG. 1, a wireless communications network 100 or system is shown. The network may be a Global System for Mobile Communication ("GSM") network, a Time Division Multiple Access ("TDMA") network, Code Division Multiple Access ("CDMA") network, a UMTS network, an Orthogonal Frequency Division Multiple Access ("OFMDA") network, a Worldwide Interoperability for Microwave Access ("WiMax") network, a WiFi network, networks utilizing Evolution-Data Optimized ("EDVO"), CDMA2000 network, 1 times Radio Transmission Technology ("1×RTT"), Long Term Evolution ("LTE") standards or another equivalent network.

Location measurement units ("LMU") and/or NSUs 115 may be dispersed throughout the system or subsystem reception area. NSUs 115 may be integrated with one or more base stations 102-106 or may be independent of a base station 102-106 and may be sparsely deployed through the network 100. The wireless network 100 serves mobile stations, UE or devices 120, 122 within reception range of at least one of the base stations 102-106. Mobile stations 120, 122 may include cellular telephones, text messaging devices, computers, portable computers, vehicle locating devices, vehicle security devices, communication devices, wireless transceivers or other devices with a wireless communications interface. Base station transceivers 102-106, also commonly referred to simply as base stations, may be operably connected to a central entity or central network unit 130. The central entity 130 may be a base station controller ("BSC") in a base station subsystem ("BSS"), a Radio Network Controller ("RNC") in a Radio Access Network ("RAN"), or, for GSM, General Packet Radio Service ("GPRS") or UMTS system, a serving mobile location center ("SMLC") or an equivalent. The connection from each base station to a BSC, SMLC or other central network entity may employ a direct transmission link, e.g., a wired connection, microwave link, Ethernet connection, and the like, or may be employed by one or more intermediate entities, e.g., an intermediate BSC in the case of a connection from a BTS to an SMLC for GSM.

Each mobile station 120, 122 may periodically measure the transmission timing difference between pairs of base stations 102-106 and/or receive network measurement reports from the network 100. For example, a mobile station 120 may measure the difference in transmission timing for communication from its serving base station 102 and from one or more neighboring base stations, e.g., 106 and/or 103. Either the mobile station or the base station may remove differences attributed primarily to propagation delays between the mobile station and base station antennas to produce a timing difference, determining timing relationships, and/or determine other values or characteristics.

For determination of observed time difference of arrivals ("OTDOAs"), frame offset and chip offset of the neighboring nodes or cells may be generally reported in a measurement report such as a network measurement report. The chip offset may generally be required for OTDOA computation. In certain embodiments of the present subject matter, a shift of 38400 chips may be added or subtracted to align the frame markers as necessary. As discussed above, embodiments of the present subject matter employed in OFDMA based systems may utilize sampling time as an appropriate time unit.

Figure 2:
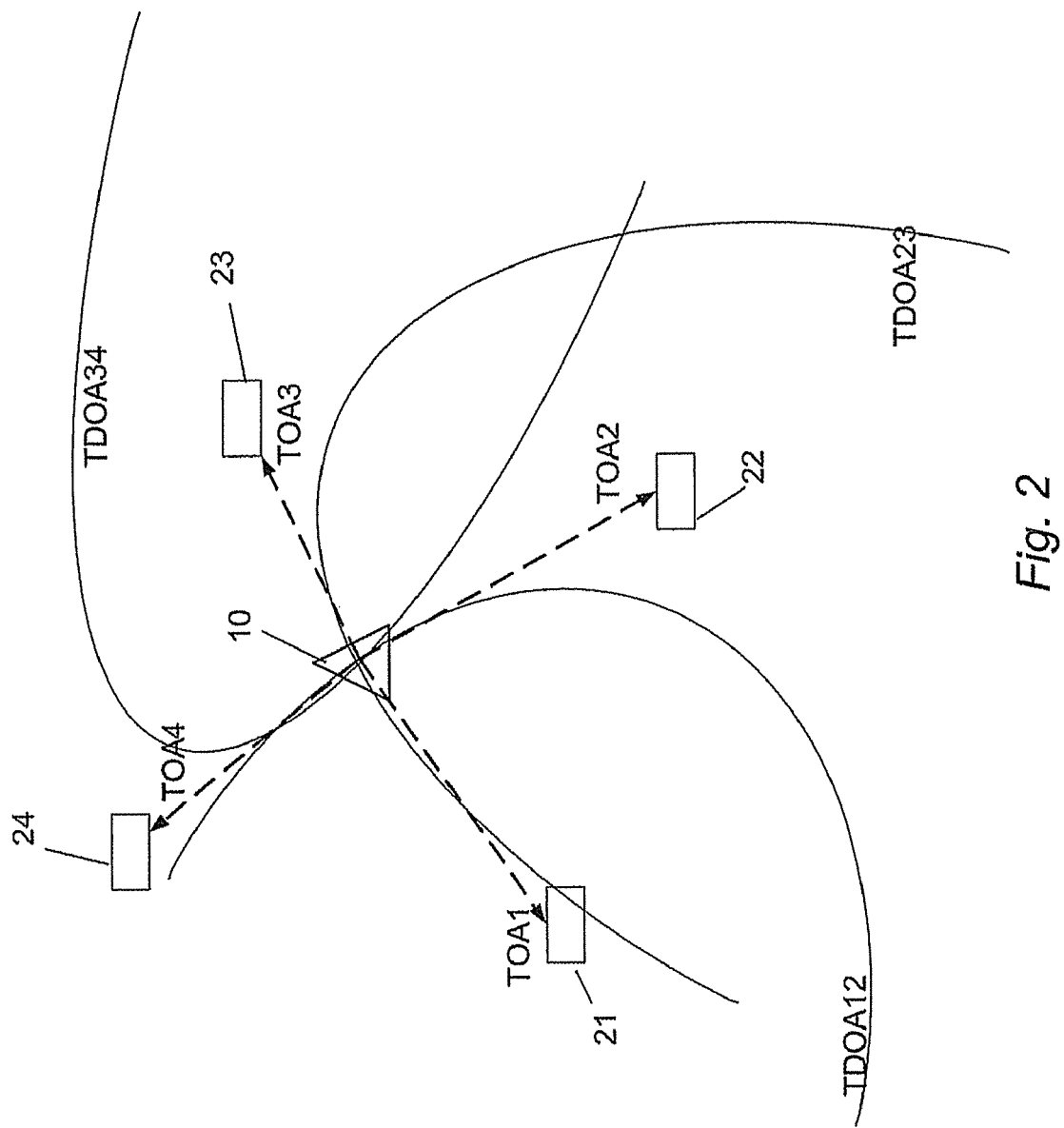
FIGS. 2-5 are pictorial representations of a system and method for locating an unknown base station according to embodiments of the present subject matter.

FIG. 2 is a pictorial representation of a system and method for locating an unknown base station according to an embodiment of the present subject matter. With reference to FIG. 2, the location of an unknown Node B 10, such as a cell or base station ("BTS"), may be determined from four LMUs, 21-24. Each of the four LMUs 21-24 may receive signals from the unknown BTS 10. The time of arrival for each LMU may be represented as TOA1, TOA2, TOA3 and TOA4. From these TOAs, respective observed time difference of arrivals may be determined. For example, the observed TDOAs between three pairs of LMUs 21-22, 22-23, 23-24 are represented as TDOA12, TDOA23 and TDOA34, respectively. The intersection point of the three hyperbolas is an estimated location of the unknown BTS 10. While four LMUs have been illustrated, such an example should not limit the scope of the claims appended herewith as embodiments of the present subject matter may utilize more than four LMUs to calculate redundant hyperbolas to make the system over-determined and provide a location estimate minimizing any estimation error. Further, in another embodiment, three LMUs may be utilized to determine a location of the unknown BTS 10 if there is a prior knowledge regarding the location of the unknown BTS 10. For example, three LMUs would result in two hyperbolas. These two hyperbolas may intersect at two points wherein one of the intersection points can be eliminated using the prior knowledge.

Figure 3:
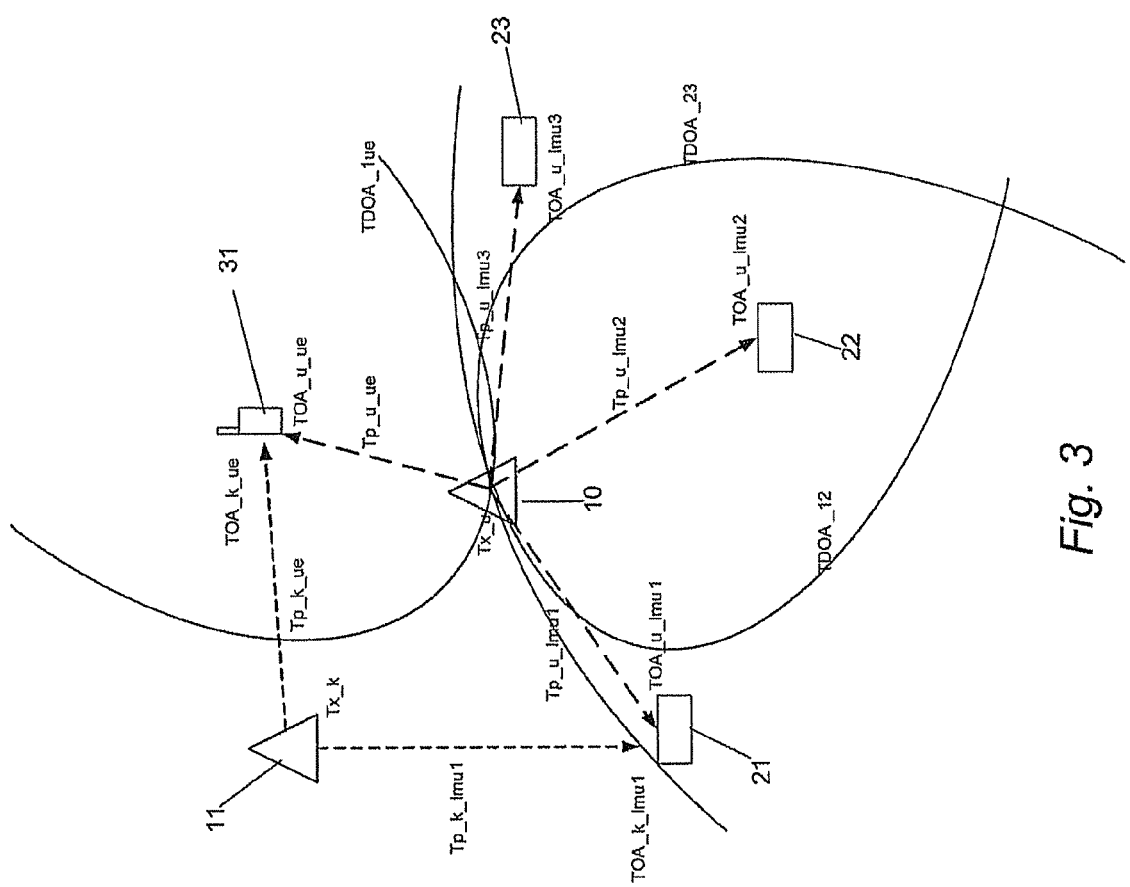

FIG. 3 is a pictorial representation of a system and method for locating an unknown base station according to an embodiment of the present subject matter. With reference to FIG. 3, the location of an unknown Node B or BTS 10 may be determined from three LMUs, 21-23, one mobile station 31 ("UE"), and one known BTS 11. The UE 31 in this exemplary network may measure the timing offset between the unknown and known BTSs 10, 11 and report the offset to the network in a measurement report. It should be noted that this embodiment of the present subject matter is not limited by the cellular technology employed in the network so long as the timing offset is reported by the UE. For example, an exemplary system may be a GSM network, a TDMA network, CDMA network, CDMA2000 network, a UMTS network, an OFDMA network, a WiMax network, a WiFi network, networks utilizing EDVO, 1×RTT, LTE standards or another equivalent network. In a UMTS network, the timing offset may be reported as SFN-SFN (type 1 or 2) or CFN-SFN. The timing offset may also be reported in terms of frames, time slots, chips, samples, or symbols and may be converted to an appropriate unit such as seconds, etc.

The timing offset measured by the UE 31 (TO_ue) is the receive time difference of the unknown and known BTSs 10, 11 at the UE 31 and may be represented as:

$$TO\_ue = TOA\_k\_ue - TOA\_u\_ue \qquad (1)$$

where TOA_k_ue represents the time of arrival for the known BTS 11 at the UE 31, and TOA_u_ue represents the time of arrival for the unknown BTS 10 at the UE 31.

TOA_k_ue and TOA_u_ue may be represented as:

$$TOA\_k\_ue = Tx\_k + Tp\_k\_ue \qquad (2)$$

$$TOA\_u\_ue = Tx\_u + Tp\_u\_ue \qquad (3)$$

where Tx_k represents the transmit time of the known BTS 11, Tp_k_ue represents the propagation delay from the known BTS 11 to the UE 31, Tx_u represents the transmit time of the unknown BTS 10, and Tp_u_ue represents the propagation delay from the unknown BTS 10 to the UE 31.

Substituting Equations (2) and (3) above into Equation (1) provides the following relationship:

$$TO\_ue = (Tx\_k + Tp\_k\_ue) - (Tx\_u + Tp\_u\_ue) \qquad (4)$$

The timing offset measured by an LMU 21 (TO_lmu1) is the receive time difference of the unknown and known BTSs 10, 11 at the UE 31 and may be represented as:

$$TO\_lmu1 = TOA\_k\_lmu1 - TOA\_u\_lmu1 \qquad (5)$$

where TOA_k_lmu1 represents the time of arrival for the known BTS 11 at the LMU 21 and TOA_u_lmu1 represents the time of arrival for the unknown BTS 10 at the LMU 21.

TOA_k_lmu1 and TOA_u_lmu1 may be represented as:

$$TOA\_k\_lmu1 = Tx\_k + Tp\_k\_lmu1 \qquad (6)$$

$$TOA\_u\_lmu1 = Tx\_u + Tp\_u\_lmu1 \qquad (7)$$

where Tp_k_lmu1 represents the propagation delay from the known BTS 11 to the LMU 21 and Tp_u_lmu1 represents the propagation delay from the unknown BTS 10 to the LMU 21.

Substituting Equations (6) and (7) above into Equation (5) provides the following relationship:

$$TO\_lmu1 = (Tx\_k + Tp\_k\_lmu1) - (Tx\_u + Tp\_u\_lmu1) \qquad (8)$$

Subtracting Equation (4) from Equation (8) provides the following relationship:

$$TO\_lmu1 - TO\_ue = (Tp\_k\_lmu1 - Tp\_k\_ue) - (Tp\_u\_lmu1 - Tp\_u\_ue) \qquad (9)$$

Moving unknown values to the right side of the Equation (9) and known values to the left side of Equation (9) provides the following relationship:

$$(Tp\_u\_lmu1 - Tp\_u\_ue) = (Tp\_lmu1 - Tp\_k\_ue) - (TO\_lmu1 - TO\_ue) \qquad (10)$$

Since the locations of the LMU 21 and the known BTS 11 are known and since waves travel at the speed of light, Tp_k_lmu1 and Tp_k_ue may be determined assuming line of site propagation between the LMU 21 and BTS 11 and the UE 31 and BTS 11. TO_lmu1 is also known since the value is measured by the LMU 21. TO_ue is known as the UE 31 reports this value in a measurement report. Hence, Tp_u_lmu1−Tp_u_ue may be determined: (Tp_u_lmu1−Tp_u_ue) may generally be identified as TDOA__1ue and represents the observed time difference of arrival between the LMU 21 and UE 31 for a transmission from the unknown BTS 10. This value may also represent a hyperbola drawn between the LMU 21 and UE 31. The timing offset between the unknown and known BTSs 10, 11 (TO_lmu1) may or may not be measured at the same time as the timing offset measurement determined by the UE 31. If TO_lmu1 values are measured at different time instants than those of the UE measurements, then an interpolation or another exemplary algorithm or process such as Kalman filtering may be employed to align the measurement time of the LMU 21 with the measurement time of the UE 31 to account for the timing drifts the BTSs may have.

Similarly, the LMUs 21, 22, 23 measure the TOA_u_lmu1, TOA_u_lmu2, and TOA_u_lmu3, respectively, as the time of arrival for the unknown BTS 10. From these TOAs, observed time difference of arrivals TDOA__12 and TDOA__23 may be determined along with the corresponding hyperbolas. The intersection point of the three hyperbolas, TDOA__1ue, TDOA__12 and TDOA__23, may be the estimated location of the unknown BTS 10. In another embodiment, additional hyperbolas may be provided to the location solution by moving the UE 31 to different locations or by utilizing measurement reports from other UEs at different locations. Further-more, multiple LMU measurements and multiple UE measurements may be utilized and/or combined to achieve a more accurate location.

Figure 4:
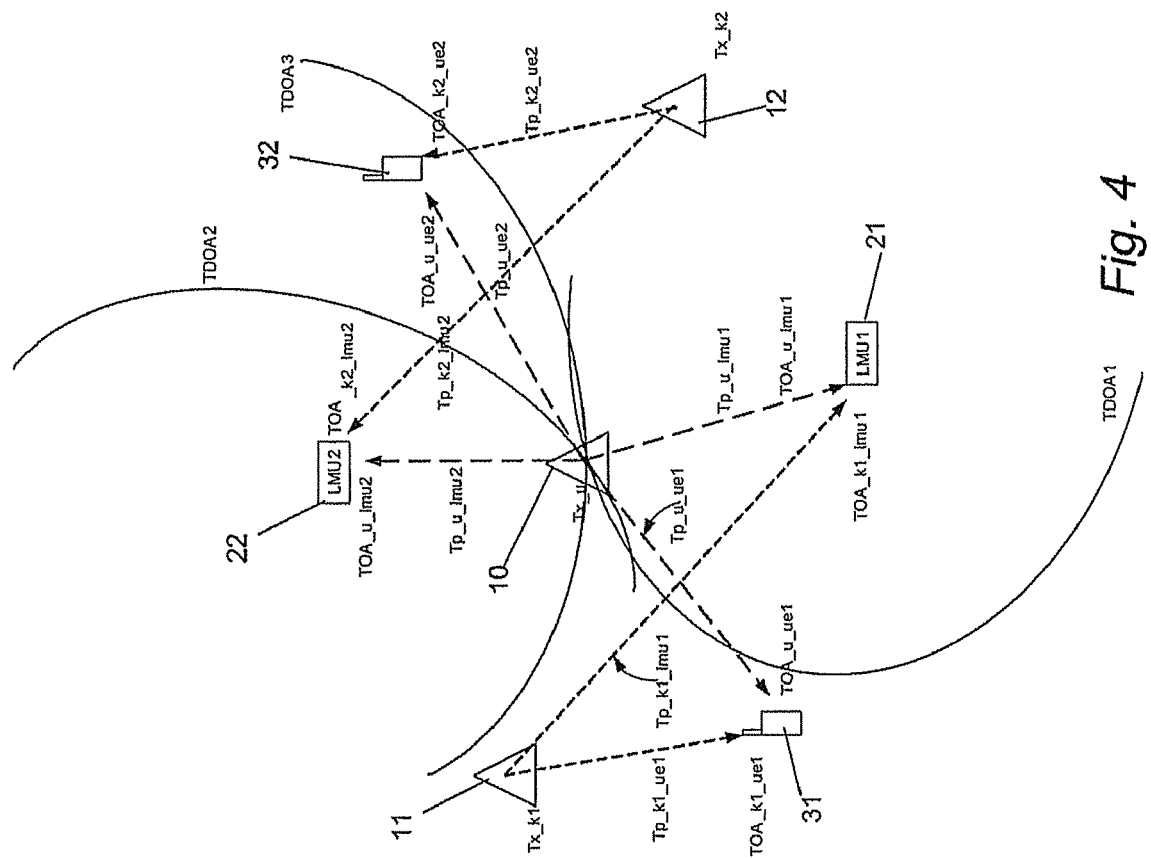

FIG. 4 is a pictorial representation of a system and method for locating an unknown base station according to an embodiment of the present subject matter. With reference to FIG. 4, the location of an unknown Node B or BTS 10 may be determined from two LMUs 21, 22 and two UEs 31, 32. The timing offset between a known BTS 11 and the unknown BTS 10 as measured by a first UE 31 (TO_ue1) may be represented as:

$$TO\_ue1 = TOA\_k1\_ue1 - TOA\_u\_ue1 = (Tx\_k1 + Tp\_k1\_ue1) - (Tx\_u + Tp\_u\_ue1) \quad (11)$$

where TOA_k1_ue1 represents the time of arrival of a signal from the known BTS 11 at the UE 31, TOA_u_ue1 represents the time of arrival of a signal from the unknown BTS 10 at the UE 31, Tx_k1 represents the transmit time for the known BTS 11, Tp_k1_ue1 represents the propagation delay between the known BTS 11 and the UE 31, Tx_u represents the transmit time of the unknown BTS 10, and Tp_u_ue1 represents the propagation delay between the unknown BTS 10 and the UE 31.

The timing offset between the known BTS 11 and the unknown BTS 10 as measured by the LMU 21 (TO_lmu1) may be represented as:

$$TO\_lmu1 = TOA\_k1\_lmu1 - TOA\_u\_lmu1 = (Tx\_k1 + Tp\_k1\_lmu1) - (Tx\_u + Tp\_u\_lmu1) \quad (12)$$

where TOA_k1_lmu1 represents the time of arrival of a signal from the known BTS 11 at the LMU 21, TOA_u_lmu1 represents the time of arrival of a signal from the unknown BTS 10 at the LMU 21, Tp_k1_lmu1 represents the propagation delay between the known BTS 11 and the LMU 21, and Tp_u_lmu1 represents the propagation delay between the unknown BTS 10 and the LMU 21.

Subtracting Equation (11) from Equation (12) provides the following relationship:

$$Tp\_u\_lmu1 - Tp\_u\_ue1 = (Tp\_k1\_lmu1 - Tp\_k1\_ue1) - (TO\_lmu1 - TO\_ue1) \quad (13)$$

The terms on the left side Equation (13) are unknown, and the terms on the right side of Equation (13) are known. Equation (13) may thus define the hyperbola TDOA1 shown in FIG. 4. Similarly, the timing offset between the second known BTS 12 and the unknown BTS 10 as measured by a second UE 32 (TO_ue2) may be provided by the following relationship:

$$TO\_ue2 = TOA\_k2\_ue2 - TOA\_u\_ue2 = (Tx\_k2 + Tp\_k2\_ue2) - (Tx\_u + Tp\_u\_ue2) \quad (14)$$

where TOA_k2_ue2 represents the time of arrival of a signal from the known BTS 12 at the second UE 32, TOA_u_ue2 represents the time of arrival of a signal from the unknown BTS 10 at the UE 32, Tx_k2 represents the transmit time for the known BTS 12, Tp_k2_ue2 represents the propagation delay between the known BTS 12 and the UE 32, and Tp_u_ue2 represents the propagation delay between the unknown BTS 10 and the UE 32.

The timing offset between the known BTS 12 and the unknown BTS 10 as measured by the second LMU 22 (TO_lmu2) may be represented as:

$$TO\_lmu2 = TOA\_k2\_lmu2 - TOA\_u\_lmu2 = (Tx\_k2 + Tp\_k2\_lmu2) - (Tx\_u + Tp\_u\_lmu2) \quad (15)$$

where TOA_k2_lmu2 represents the time of arrival of a signal from the known BTS 12 at the LMU 22, TOA_u_lmu2 represents the time of arrival of a signal from the unknown BTS 10 at the LMU 22, Tp_k2_lmu2 represents the propagation delay between the known BTS 12 and the LMU 22, and Tp_u_lmu2 represents the propagation delay between the unknown BTS 10 and the LMU 22.

Subtracting Equation (14) from Equation (15) results in the following relationship:

$$Tp\_u\_lmu2 - Tp\_u\_ue2 = (Tp\_k2\_lmu2 - Tp\_k2\_ue2) - (TO\_lmu2 - TO\_ue2) \quad (16)$$

Equation (16) may generally define the hyperbola TDOA2 illustrated in FIG. 4. The observed time difference of arrival of the unknown BTS 10 between the LMUs 21, 22 (TOA_u_lmu1 − TOA_u_lmu2) may define the hyperbola TDOA3 illustrated in FIG. 4. The intersection point of the three hyperbolas, TDOA1, TDOA2, TDOA3, may represent an estimated location of the unknown BTS 10.

Figure 5:
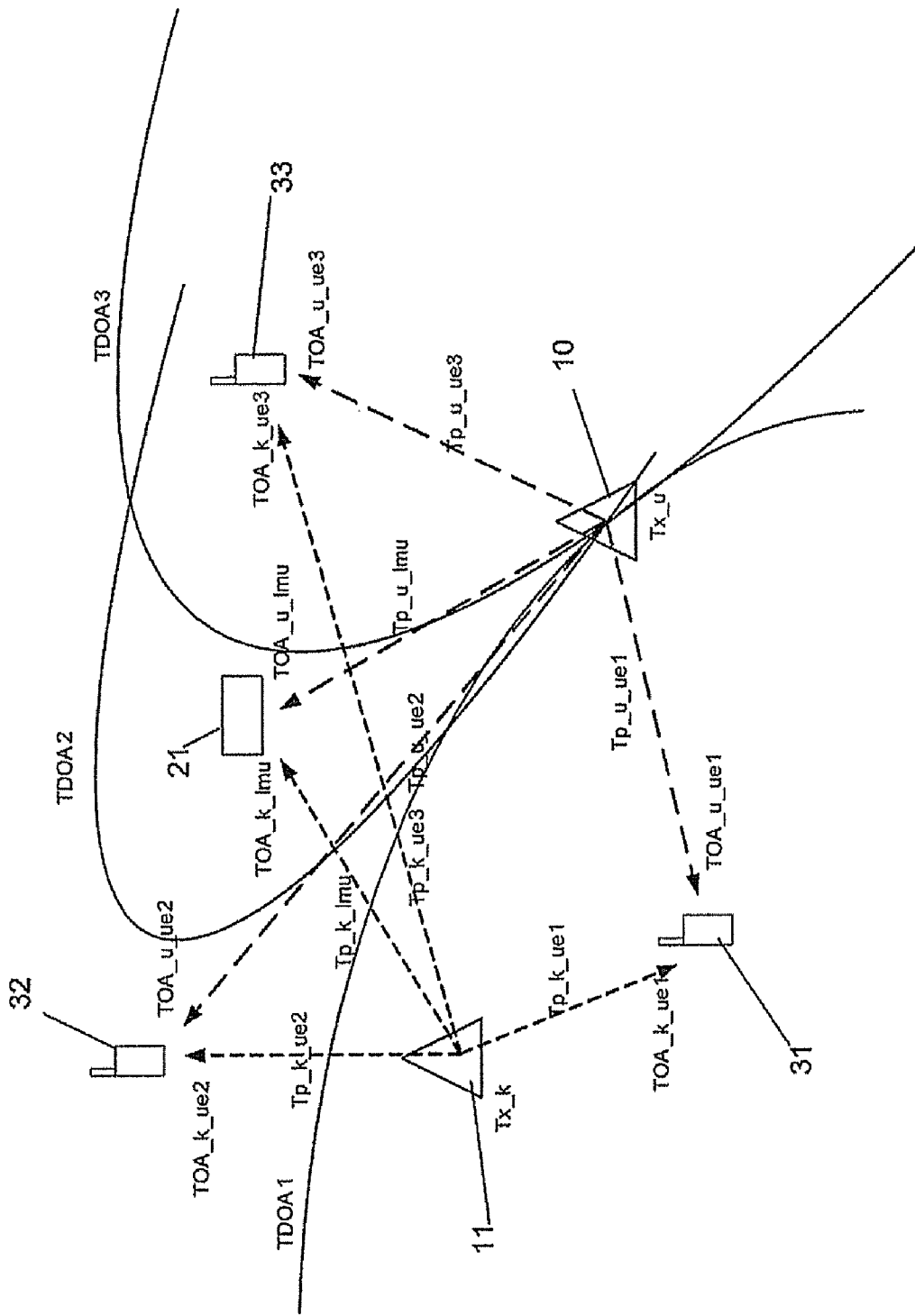

FIG. 5 is a pictorial representation of a system and method for locating an unknown base station according to an embodiment of the present subject matter. With reference to FIG. 5, the location of an unknown Node B or BTS 10 may be determined from one LMU 21 and three UEs 31, 32, 33. In one embodiment, these UEs may be a single UE moved to different locations in the network to provide measurement reports from the different locations at different times. Of course, these UEs may be any number of separate UEs and the example depicted in the figure should not limit the scope of the claims appended herewith.

The timing offsets between the known BTS 11 and the unknown BTS 10 as measured by the UEs 31, 32, 33 (TO_ue1, TO_ue2, TO_ue3) may be represented by the following relationships, respectively:

$$TO\_ue1 = TOA\_k\_ue1 - TOA\_u\_ue1 = (Tx\_k + Tp\_k\_ue1) - (Tx\_u + Tp\_u\_ue1) \quad (17)$$

$$TO\_ue2 = TOA\_k\_ue2 - TOA\_u\_ue2 = (Tx\_k + Tp\_k\_ue2) - (Tx\_u + Tp\_u\_ue2) \quad (18)$$

$$TO\_ue3 = TOA\_k\_ue3 - TOA\_u\_ue3 = (Tx\_k + Tp\_k\_ue3) - (Tx\_u + Tp\_u\_ue3) \quad (19)$$

where TOA_k_ue1 represents the time of arrival of a signal from the known BTS 11 at the UE 31, TOA_k_ue2 represents the time of arrival of a signal from the known BTS 11 at the UE 32, and TOA_k_ue3 represents the time of arrival of a signal from the known BTS 11 at the UE 33. TOA_u_ue1 represents the time of arrival of a signal from the unknown BTS 10 at the UE 31, TOA_u_ue2 represents the time of arrival of a signal from the unknown BTS 10 at the UE 32, and TOA_u_ue3 represents the time of arrival of a signal from the unknown BTS 10 at the UE 33. Tx_k represents the transmit time of the known BTS 11, Tp_k_ue1 represents the propagation delay for a signal from the known BTS 11 to the UE 31, Tp_k_ue2 represents the propagation delay for a signal from the known BTS 11 to the UE 32, and Tp_k_ue3 represents the propagation delay for a signal from the known BTS 11 to the UE 33. Tx_u represents the transmit time of the unknown BTS 10, Tp_u_ue1 represents the propagation delay for a signal from the unknown BTS 10 to the UE 31, Tp_u_ue2 represents the propagation delay for a signal from the unknown BTS 10 to the UE 32, and Tp_u_ue3 represents the propagation delay for a signal from the unknown BTS 10 to the UE 33.

The timing offset between the known BTS 11 and the unknown BTS 10 as measured by the LMU 21 (TO_lmu) may be represented by the following relationship:

$$TO\_lmu = TOA\_k\_lmu - TOA\_u\_lmu = (Tx\_k\_lmu) - (Tx\_u + Tp\_u\_mu) \quad (20)$$

where TOA_k_lmu represents the time of arrival of a signal from the known BTS 11 at the LMU 21, TOA_u_lmu represents the time of arrival of a signal from the unknown BTS 10 at the LMU 21, Tp_k_lmu represents the propagation delay for a signal from the known BTS 11 to the LMU 21, and Tp_u_lmu represents the propagation delay for a signal from the unknown BTS 10 to the LMU 21.

Subtracting Equations (17), (18), and (19) separately from Equation (20) and rearranging the known and unknown terms therein yield the following relationships:

$$(Tp\_u\_lmu-Tp\_u\_ue1)=(Tp\_k\_lmu-Tp\_k\_ue1)-(TO\_lmu-TO\_ue1) \quad (21)$$

$$(Tp\_u\_lmu-Tp\_u\_ue2)=(Tp\_k\_lmu-Tp\_k\_ue2)-(TO\_lmu-TO\_ue2) \quad (22)$$

$$(Tp\_u\_lmu-Tp\_u\_ue3)=(Tp\_k\_lmu-Tp\_k\_ue3)-(TO\_lmu-TO\_ue3) \quad (23)$$

Equations (21), (22), and (23) may each generally define respective hyperbolas, TDOA1, TDOA2, TDOA3, between the LMU 21 and the UEs 31, 32, 33 illustrated in FIG. 5. The intersection point of the three hyperbolas TDOA1, TDOA2, TDOA3 represents an estimated location of the unknown BTS 10.

FIG. 6 is an algorithm according to an embodiment of the present subject matter. With reference to FIG. 6, a method for estimating a location of an unknown Node B in a wireless communication system having a plurality of other nodes and a plurality of LMUs is provided. Exemplary nodes may be, but are not limited to, base stations, base station sectors, and combinations thereof. An exemplary communication system may be, but is not limited, to a UMTS network, WiMax network, GSM network, OFDMA network, WiFi network, and CDMA network. Further, the system may operate under a standard such as IS-95, EDVO, CDMA2000, LTE and 1×RTT. The nodes may or may not be synchronized. In one embodiment the nodes may be synchronized as a function of information received from a satellite signal or may be synchronized as a function of information transmitted from a component of the system such as an NSU. At step 610 first and second values based on a network timing characteristic for any one or several of the nodes may be determined. The network timing characteristic may be a frame offset such as an SFN and the like. An OTDOA hyperbola based on the first and second values may be calculated at step 620. At step 630, a location of the unknown Node B may be estimated as a function of the OTDOA hyperbola. In another embodiment, a third value, such as a round trip time ("RTT") value, a cell identification value, a signal strength value, etc., may be determined to assist in estimating the location of the unknown Node B.

Figure 7:
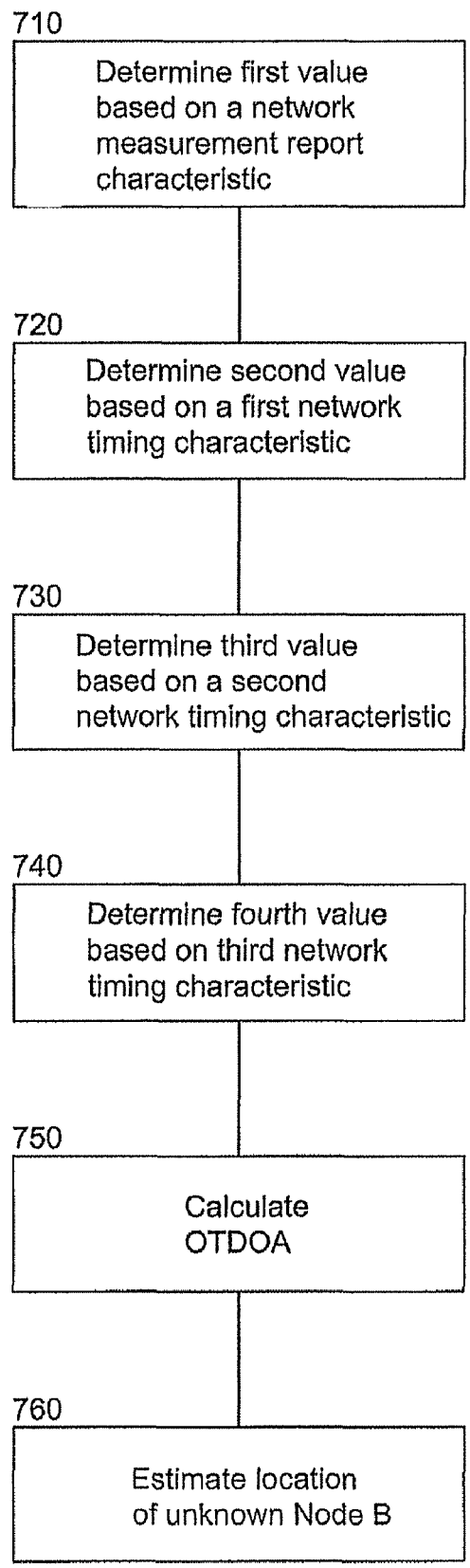
FIG. 7 is an algorithm according to another embodiment of the present subject matter.

FIG. 7 is an algorithm according to another embodiment of the present subject matter. With reference to FIG. 7, a method for estimating a location of an unknown Node B in a wireless communication system having a plurality of other nodes and a plurality of LMUs is provided. At step 710, a first value based on a network measurement report characteristic may be determined. In one embodiment, the network measurement report characteristic may be a time offset between a first node and the unknown Node B. Of course, the first node may be a serving or neighboring BTS or node.

At step 720, a second value based on a first network timing characteristic may be determined, at step 730, a third value based on a second network timing characteristic may be determined, and at step 740 a fourth value based on a third network timing characteristic may be determined. Any one or combination of the first, second and third network timing characteristics may be an exemplary frame or time offset. For example, in one embodiment, the first network timing characteristic may be a time offset between a first node and the unknown Node B measured by an LMU. In another embodiment, the second network timing characteristic may be a time offset between the first node and the unknown Node B measured by another LMU. Further, the third network timing characteristic may be a time offset between the first node and the unknown Node B measured by a third LMU. Exemplary nodes may be base stations, base station sectors, and combinations thereof, and the nodes may or may not be synchronized. An OTDOA hyperbola may then be calculated based on at least one of the first, second, third, or fourth values at step 750, and at step 760, a location of the unknown Node B may be estimated as a function of the OTDOA hyperbola. In one embodiment, the calculation of the OTDOA hyperbola may include calculating a first OTDOA hyperbola based on the first and second values, calculating a second OTDOA hyperbola based on the second and third values, and calculating a third OTDOA hyperbola based on the third and fourth values. In another embodiment, the estimated location of the unknown Node B may be a function of an RTT value, a cell identification value, a signal strength value, etc.

Figure 8:
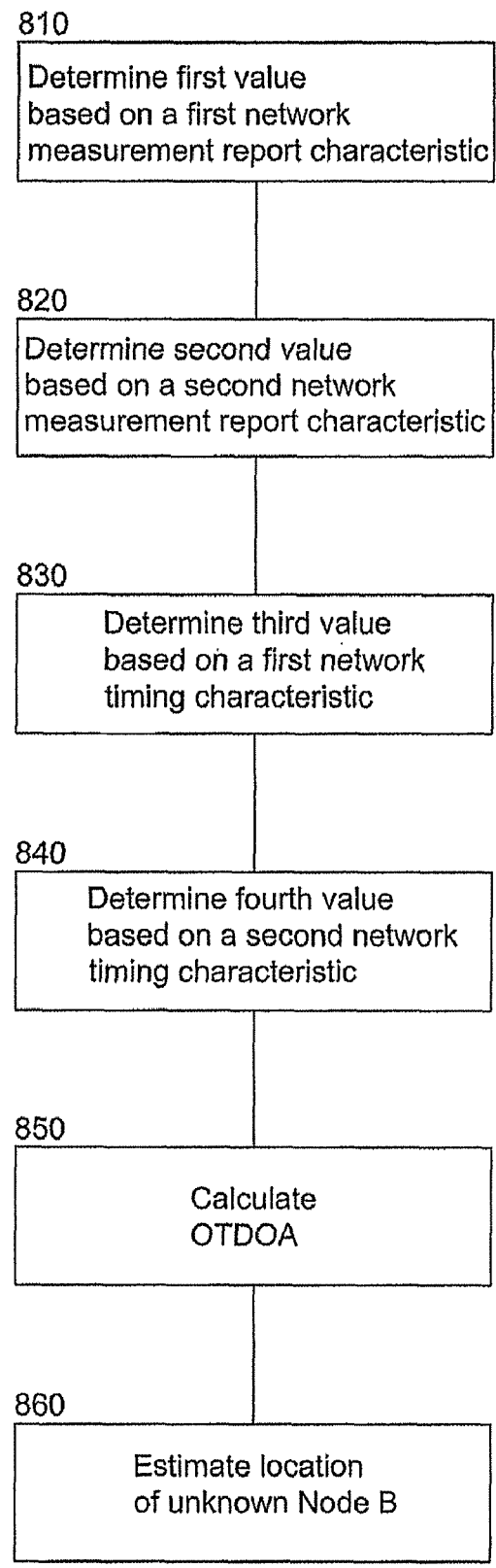
FIG. 8 is an algorithm according to yet another embodiment of the present subject matter.

FIG. 8 is an algorithm according to a further embodiment of the present subject matter. With reference to FIG. 8, a method for estimating a location of an unknown Node B in a wireless communication system having a plurality of other nodes and a plurality of LMUs is provided. At step 810, a first value based on a first network measurement report characteristic may be determined, and at step 820 a second value based on a second network measurement report characteristic may be determined. In one embodiment, the first network measurement report characteristic may be a time offset between a serving or neighboring node and the unknown Node B, and the second network measurement report characteristic may be another time offset between a neighboring or serving node and the unknown Node B. Exemplary wireless devices may be, but are not limited to, a cellular device, text messaging device, computer, portable computer, vehicle locating device, vehicle security device, communication device, and wireless transceiver. Further, exemplary time offsets may be a chip offset, frame offset, symbol offset and sample offset.

At step 830, a third value based on a first network timing characteristic may be determined, and at step 840 a fourth value based on a second network timing characteristic may be determined. Any one or both of the first and second network timing characteristics may be an exemplary frame or time offset. For example, in one embodiment, the first network timing characteristic may be a time offset between a serving or neighboring node and the unknown Node B measured by an LMU. Further, the second network timing characteristic may be a time offset between a neighboring or serving node and the unknown Node B measured by another LMU. Exemplary nodes may be base stations, base station sectors, and combinations thereof and the nodes may or may not be synchronized. An OTDOA hyperbola may then be calculated based on at least one of the first, second, third, or fourth values at step 850, and at step 860, a location of the unknown Node B estimated as a function of the OTDOA hyperbola. In one embodiment, the calculation of the OTDOA hyperbola may include calculating a first OTDOA hyperbola based on the first and second values, calculating a second OTDOA hyperbola based on the second and third values, and calculating a third OTDOA hyperbola based on the third and fourth values. In another embodiment, the estimated location of the unknown Node B may be a function of an RTT value, a cell identification value, a signal strength value, etc.

Figure 9:
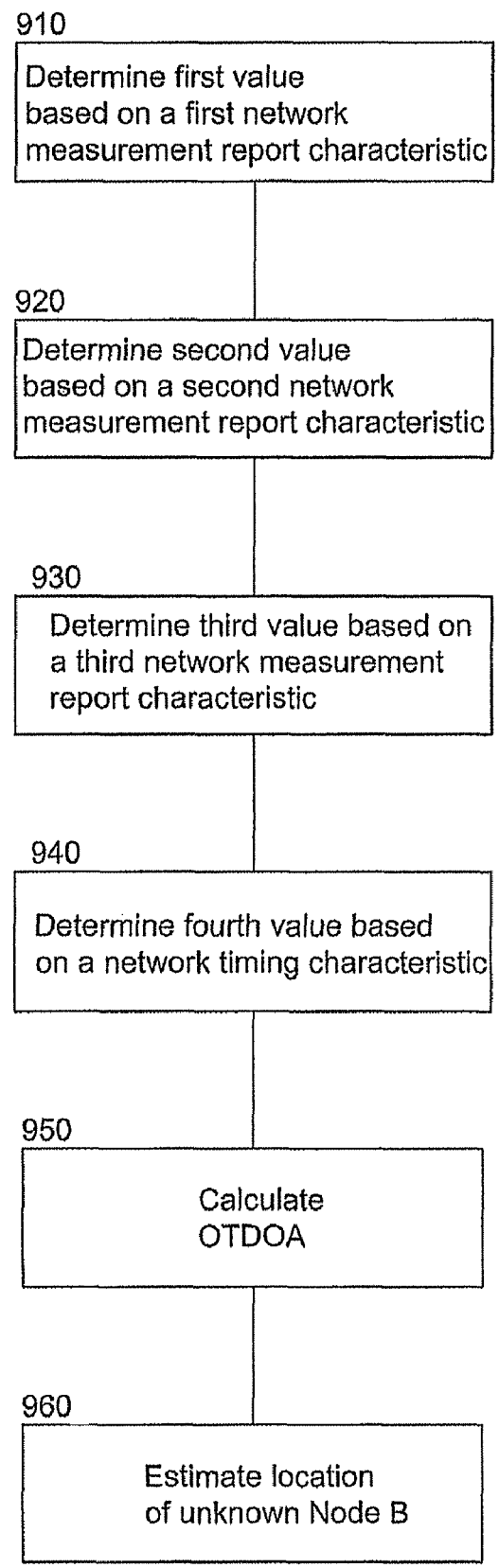
FIG. 9 is an algorithm according to one embodiment of the present subject matter.

FIG. 9 is an algorithm according to an additional embodiment of the present subject matter. With reference to FIG. 9, a method for estimating a location of an unknown Node B in a wireless communication system having a plurality of other nodes and a plurality of LMUs is provided. At step 910, a first value based on a first network measurement report characteristic may be determined, at step 920 a second value based on a second network measurement report characteristic may be determined, and at step 930, a third value based on a third network measurement report characteristic may be determined. In one embodiment, the first network measurement report characteristic may be a first time offset between a serving or neighboring node and the unknown Node B, and the second network measurement report characteristic may be a second time offset between the serving or neighboring node and the unknown Node B. The third network measurement report characteristic may be a third time offset between the serving or neighboring node and the unknown Node B. An exemplary wireless device may be a cellular device, text messaging device, computer, portable computer, vehicle locating device, vehicle security device, communication device, and wireless transceiver. Further, any one or combination of the first, second or third time offsets may be a chip offset, frame offset, symbol offset and/or sample offset.

At step 940, a fourth value based on a network timing characteristic may be determined. In one embodiment, the network timing characteristic may be an exemplary frame or time offset. For example, the network timing characteristic may be a time offset between a serving or neighboring node and the unknown Node B measured by an LMU. Exemplary nodes may be base stations, base station sectors, and combinations thereof and the nodes may or may not be synchronized. An OTDOA hyperbola based on at least one of the first, second, third, or fourth values may then be calculated at step 950, and at step 960 a location of the unknown Node B estimated as a function of the OTDOA hyperbola. In one embodiment, the calculation of the OTDOA hyperbola may include calculating a first OTDOA hyperbola based on the first and second values, calculating a second OTDOA hyperbola based on the second and third values, and calculating a third OTDOA hyperbola based on the third and fourth values. In another embodiment, the estimated location of the unknown Node B may be a function of an RTT value, a cell identification value, a signal strength value, etc.

Figure 10:
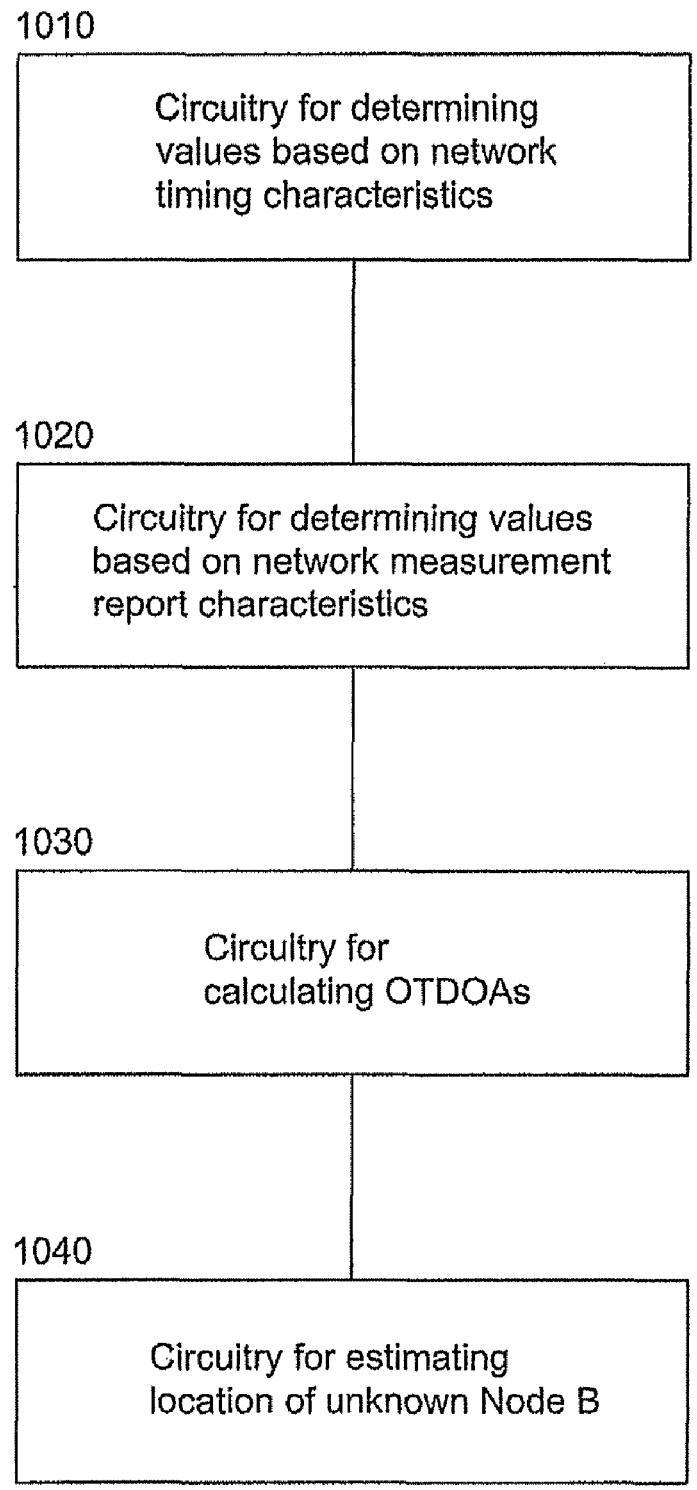
FIG. 10 is an illustration of a communications system according to an embodiment of the present subject matter.

FIG. 10 is an illustration of a communications system according to an embodiment of the present subject matter. With reference to FIG. 10, a system 1000 is illustrated for estimating a location of an unknown Node B in a wireless communication system having a plurality of other nodes and a plurality of LMUs. The system 1000 may be a UMTS network, WiMax network, GSM network, OFDMA network, WiFi network, or CDMA network and may operate under a standard such as, but not limited to, IS-95, EDVO, LTE, CDMA2000, and 1×RTT. The system 1000 may include circuitry 1010 for determining a first value based on a network timing characteristic for one of the nodes, and circuitry 1020 for determining a second value based on a network measurement report characteristic. Exemplary nodes may be, but are not limited to, base stations, base station sectors, and combinations thereof. Further, the nodes may or may not be synchronized. For example, the nodes may be synchronized as a function of information received from a satellite signal or may be synchronized as a function of information transmitted from a component of the system 1000 such as an NSU. An exemplary network timing characteristic may be a frame offset such as a SFN or the like. An exemplary network measurement report characteristic may be, but is not limited to, a time offset value such as a chip offset value, sample offset value, etc. Circuitry 1030 for calculating an OTDOA hyperbola based on the first and second values may also be included in the system 1000. The system 1000 may further comprise circuitry 1040 for estimating a location of the unknown Node B as a function of the OTDOA hyperbola.

Figure 11:
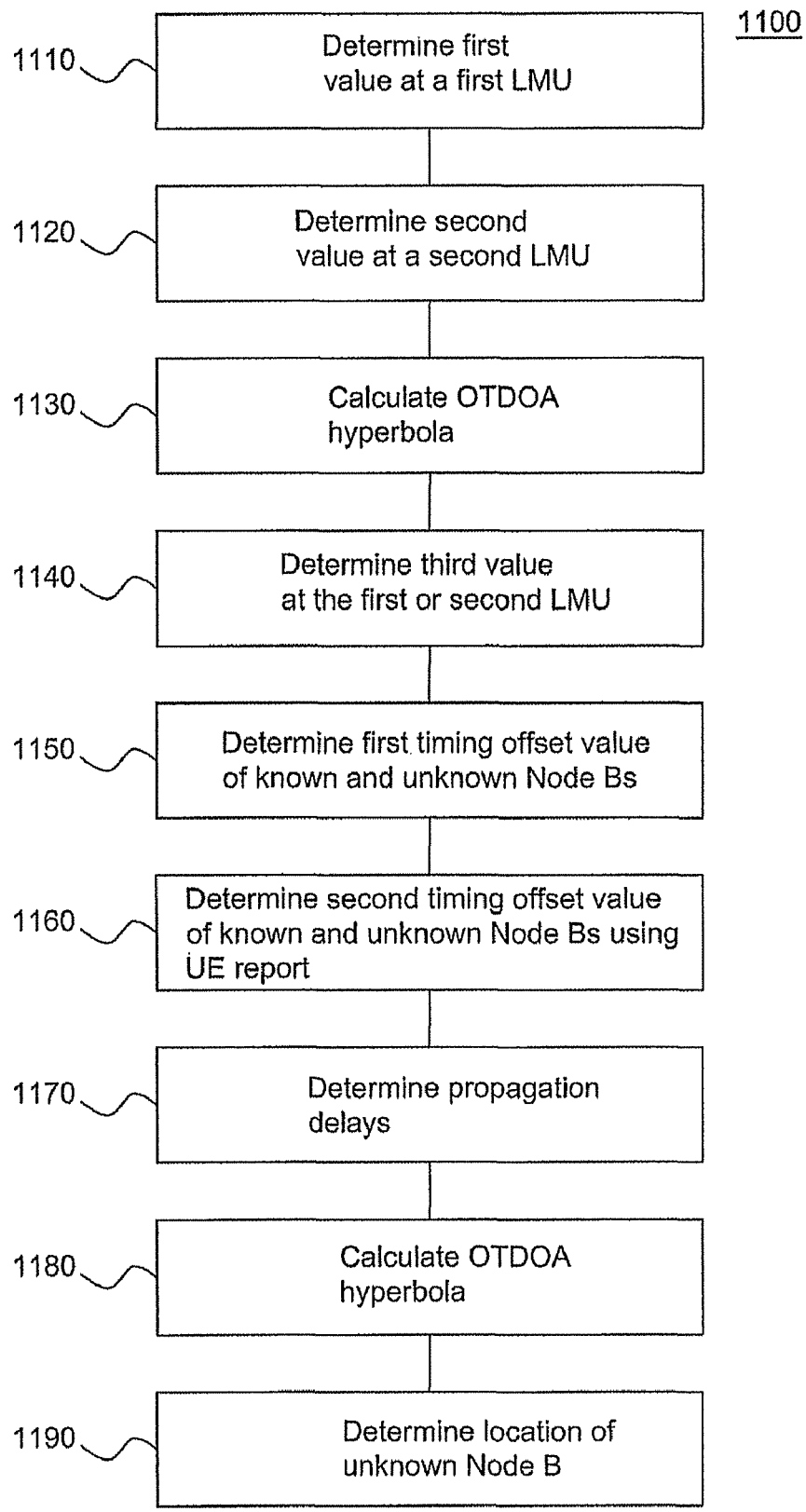
FIG. 11 is another algorithm according to one embodiment of the present subject matter.

FIG. 11 is another algorithm according to an embodiment of the present subject matter. With reference to FIG. 11, an exemplary method 1100 is illustrated for estimating a location of an unknown Node B in a wireless communication system having a plurality of other nodes and a plurality of LMUs. The method 1100 may include at step 1110, determining a first value based on a first network timing characteristic of the unknown Node B at a first LMU and at step 1120, determining a second value based on a second network timing characteristic of the unknown Node B at a second LMU. Exemplary first and second values may be downlink timing values of the unknown Node B. One or more OTDOA hyperbolas may then be calculated based on at least the first and second values at step 1130. At step 1140, a third value may be determined based on a third network timing characteristic of a known Node B at one of the first or second LMUs. At step 1150, a first timing offset value between the known and unknown Node Bs may be determined from any combination of the first, second and third values, and at step 1160, a second timing offset value may be determined between the known and unknown Node Bs using a network measurement report from a UE at any known location. The propagation delay from the known Node B to the LMU and/or UE may then be determined as a function of the timing offset values at step 1170, and one or more OTDOA hyperbolas calculated based on any combination of the first timing offset value, second timing offset value, third value, and propagation delay at step 1180. A location of the unknown Node B may then be estimated as a function of the OTDOA hyperbolas at step 1190.

It is therefore an aspect of embodiments of the present subject matter to locate an unknown Node B or base station using a combination of LMU and UE measurements. In an exemplary method, the LMUs may measure the time of arrival of known and unknown base stations, and the UEs may measure the timing offset between the known and unknown base stations. Hyperbolas between LMUs and between LMUs and UEs may be computed utilizing the LMU and UE measurements. Additional hyperbolas generated by UE measurements may also provide location estimations in situations where there are not enough LMU-LMU hyperbolas due to sparse deployment of LMUs or due to low BTS hearability at the LMUs. Even in embodiments having sufficient LMU-LMU hyperbolas for location estimations, inclusion of additional LMU-UE hyperbolas may increase the accuracy of the location estimation.

In embodiments of the present subject matter having synchronized nodes, such synchronization may be accomplished by several alternative methods including, but not limited to, training a node's oscillator by a GPS sourced signal, tracking the signal of a neighboring node, etc. In embodiments of the present subject matter having unsynchronized nodes, the timing offset between nodes may be measured and appropriately subtracted from the respective computation described above. By way of a non-limiting example, an NSU or timing measurement unit ("TMU") may be utilized to directly estimate the timing offset. Further, another embodiment may deploy a timing bank that utilizes measurement reports from a GPS enabled mobile device to track the base station drift.

It is also an aspect of embodiments of the present subject matter to derive hyperbolas between two or more nodes such as neighboring and/or serving nodes or cells using the knowledge of base station SFN timing and the CFN-SFN measurements at a UE. It is another aspect of embodiments of the present subject matter to utilize location information provided by the hyperbolas as a component of a hybrid solution method that uses other location techniques such as Cell-ID, E-CID, RTT, A-GPS, UTDOA, and/or RSSI based techniques.

It should be noted that the examples described herein should not limit the scope of the claims appended herewith. Any combination of one or more LMUs, one or more UEs, one or more known base stations, and one or more unknown base stations may be utilized. Further, measurement reports from one UE at different locations at different times may also be employed in embodiments of the present subject matter. Additionally, other well-known triangulation methods may be employed to estimate the most likely location of an unknown BTS and the discussion of time difference of arrivals herein should not limit the scope of the claims appended herewith.

As shown by the various configurations and embodiments illustrated in FIGS. 1-11, a system and method for locating an unknown base station or Node B have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A method for estimating a location of an unknown Node B in a wireless communication system having a plurality of other nodes and a plurality of location measurement units ("LMU"), the method comprising:
    (a) determining a first value based on a network measurement report characteristic;
    (b) determining a second value based on a first network timing characteristic one of the plural LMUs;
    (c) determining a third value based on a second network timing characteristic;
    (d) determining a fourth value based on a third network timing characteristic;
    (e) calculating an observed time difference of arrival ("OTDOA") hyperbola based on at least one of said first, second, third, or fourth values; and
    (f) estimating a location of said unknown Node B as a function of said OTDOA hyperbola,
    wherein said network measurement report characteristic is a time offset between a first node and said unknown Node B, and
    wherein said first network timing characteristic is a time offset between a first node and said unknown Node B measured by a first LMU in said plurality of LMUs.

2. The method of claim 1 wherein said first node is a serving or neighboring node.

3. The method of claim 1 wherein said time offset is selected from the group consisting of: chip offset, frame offset, symbol offset and sample offset.

4. The method of claim 1 wherein calculating said OTDOA hyperbola includes:
    (i) calculating a first OTDOA hyperbola based on said first and second values;
    (ii) calculating a second OTDOA hyperbola based on said second and third values; and
    (iii) calculating a third OTDOA hyperbola based on said third and fourth values.

5. The method of claim 1 wherein at least one of said first, second and third network timing characteristics is a time offset.

6. The method of claim 5 wherein said time offset is selected from the group consisting of: chip offset, frame offset, symbol offset and sample offset.

7. The method of claim 1 wherein said second network timing characteristic is a time offset between the first node and said unknown Node B measured by a second LMU.

8. The method of claim 1 wherein said third network timing characteristic is a time offset between the first node and said unknown Node B measured by a third LMU.

9. The method of claim 1 wherein said nodes are selected from a group consisting of: base stations, base station sectors, and combinations thereof.

10. The method of claim 1 wherein said communication system is selected from a group consisting of: Universal Mobile Telecommunications System ("UMTS") network, Worldwide Interoperability for Microwave Access ("WiMax") network, Global System for Mobile Communications ("GSM") network, Orthogonal Frequency Division Multiple Access ("OFDMA") network, WiFi network, and Code Division Multiple Access ("CDMA") network.

11. The method of claim 10 wherein said system operates under a standard selected from a group consisting of: IS-95, Long Term Evolution ("LTE"), Evolution-Data Optimized ("EDVO"), CDMA2000, and 1 times Radio Transmission Technology ("1xRTT").

12. The method of claim 9 wherein the estimating of the location of said unknown Node B includes determining another value selected from a group consisting of: a round trip time ("RTT") value, a cell identification value, a signal strength value, and combinations thereof.

13. A method for estimating a location of an unknown Node B in a wireless communication system having a plurality of other nodes and a plurality of location measurement units ("LMU"), the method comprising:
    (a) determining a first value based on a first network measurement report characteristic;
    (b) determining a second value based on a second network measurement report characteristic;
    (c) determining a third value based on a first network timing characteristic by one of the plural LMUs;
    (d) determining a fourth value based on a second network timing characteristic;
    (e) calculating an observed time difference of arrival ("OTDOA") hyperbola based on at least one of said first, second, third, or fourth values; and
    (f) estimating a location of said unknown Node B as a function of said OTDOA hyperbola,
    wherein said first network measurement report characteristic is a first time offset between a serving node serving a wireless device and said unknown Node B, and
    wherein said first network timing characteristic is a time offset between the serving node serving the wireless device and said unknown Node B measured by a first LMU in said plurality of LMUs.

14. The method of claim 13 wherein said second network measurement report characteristic is a second time offset between a neighboring node and said unknown Node B.

15. The method of claim 14 wherein said wireless device is selected from a group consisting of: cellular device, text messaging device, computer, portable computer, vehicle locating device, vehicle security device, communication device, and wireless transceiver.

16. The method of claim 14 wherein at least one of said first or second time offsets is selected from a group consisting of: chip offset, frame offset, symbol offset and sample offset.

17. The method of claim 13 wherein calculating said OTDOA hyperbola includes:
(i) calculating a first OTDOA hyperbola based on said first and second values;
(ii) calculating a second OTDOA hyperbola based on said second and third values; and
(iii) calculating a third OTDOA hyperbola based on said third and fourth values.

18. The method of claim 13 wherein said at least one of said first and second network timing characteristics is a time offset.

19. The method of claim 18 wherein said time offset is selected from a group consisting of: chip offset, frame offset, symbol offset and sample offset.

20. The method of claim 13 wherein said second network timing characteristic is a time offset between a neighboring node and said unknown Node B measured by a second LMU.

21. The method of claim 13 wherein said nodes are selected from a group consisting of: base stations, base station sectors, and combinations thereof.

22. The method of claim 13 wherein said communication system is selected from a group consisting of: Universal Mobile Telecommunications System ("UMTS") network, Worldwide Interoperability for Microwave Access ("WiMax") network, Global System for Mobile Communications ("GSM") network, Orthogonal Frequency Division Multiple Access ("OFDMA") network, WiFi network, and Code Division Multiple Access ("CDMA") network.

23. The method of claim 22 wherein said system operates under a standard selected from a group consisting of: IS-95, Long Term Evolution ("LTE"), Evolution-Data Optimized ("EDVO"), CDMA2000, and 1 times Radio Transmission Technology ("1×RTT").

24. The method of claim 13 wherein the estimating of the location of said unknown Node B includes determining another value selected from a group consisting of: a round trip time ("RTT") value, a cell identification value, a signal strength value, and combinations thereof.

25. A method for estimating a location of an unknown Node B in a wireless communication system having a plurality of other nodes and a plurality of location measurement units ("LMU"), the method comprising:
(a) determining a first value based on a first network measurement report characteristic;
(b) determining a second value based on a second network measurement report characteristic;
(c) determining a third value based on a third network measurement report characteristic;
(d) determining a fourth value based on a network timing characteristic by one of the plural LMUs;
(e) calculating an observed time difference of arrival ("OTDOA") hyperbola based on at least one of said first, second, third, or fourth values; and
(f) estimating a location of said unknown Node B as a function of said OTDOA hyperbola,
wherein said first network measurement report characteristic is a first time offset between a serving or neighboring node and said unknown Node B, and
wherein said network timing characteristic is a time offset as determined by one of said plural LMUs.

26. The method of claim 25 wherein said second network measurement report characteristic is a second time offset between said serving or neighboring node and said unknown Node B, and said third network measurement report characteristic is a third time offset between said serving or neighboring node and said unknown Node B.

27. The method of claim 26 wherein at least one of said first, second or third time offsets is selected from a group consisting of: chip offset, frame offset, symbol offset and sample offset.

28. The method of claim 25 wherein calculating said OTDOA hyperbola includes:
(i) calculating a first OTDOA hyperbola based on said first and second values;
(ii) calculating a second OTDOA hyperbola based on said second and third values; and
(iii) calculating a third OTDOA hyperbola based on said third and fourth values.

29. The method of claim 25 wherein said time offset is selected from a group consisting of: chip offset, frame offset, symbol offset and sample offset.

30. The method of claim 25 wherein said network timing characteristic is the time offset between a serving node serving a wireless device and said unknown Node B measured by an LMU in said plurality of LMUs.

31. The method of claim 25 wherein said nodes are selected from a group consisting of: base stations, base station sectors, and combinations thereof.

32. The method of claim 25 wherein said communication system is selected from a group consisting of: Universal Mobile Telecommunications System ("UMTS") network, Worldwide Interoperability for Microwave Access ("WiMax") network, Global System for Mobile Communications ("GSM") network, Orthogonal Frequency Division Multiple Access ("OFDMA") network, WiFi network, and Code Division Multiple Access ("CDMA") network.

33. The method of claim 32 wherein said system operates under a standard selected from a group consisting of: IS-95, Long Term Evolution ("LTE"), Evolution-Data Optimized ("EDVO"), CDMA2000, and 1 times Radio Transmission Technology ("1×RTT").

34. The method of claim 25 wherein the estimating of the location of said unknown Node B includes determining another value selected from a group consisting of: a round trip time ("RTT") value, a cell identification value, a signal strength value, and combinations thereof.

35. A system for estimating a location of an unknown Node B in a wireless communication system having a plurality of other nodes and a plurality of location measurement units ("LMU"), the system comprising:
(a) circuitry for determining a first value based on a network timing characteristic for one of said nodes;
(b) circuitry for determining a second value based on a network measurement report characteristic;
(c) circuitry for calculating an observed time difference of arrival ("OTDOA") hyperbola based on said first and second values; and
(d) circuitry for estimating the location of said unknown Node B as a function of said OTDOA hyperbola,
wherein said network timing characteristic is a frame offset, and
wherein said network measurement report characteristic is a time offset value.

36. The system of claim 35 wherein said nodes are selected from a group consisting of: base stations, base station sectors, and combinations thereof.

37. The system of claim 35 wherein said communication system is selected from a group consisting of: Universal Mobile Telecommunications System ("UMTS") network, Worldwide Interoperability for Microwave Access ("WiMax") network, Global System for Mobile Communications ("GSM") network, Orthogonal Frequency Division Multiple Access ("OFDMA") network, WiFi network, and Code Division Multiple Access ("CDMA") network.

38. The system of claim 37 wherein said system operates under a standard selected from a group consisting of: IS-95, Evolution-Data Optimized ("EDVO"), CDMA2000, Long Term Evolution ("LTE") and 1 times Radio Transmission Technology ("1xRTT").

39. The system of claim 35 wherein said frame offset is a system frame number ("SFN").

40. The system of claim 35 wherein said time offset value is selected from a group consisting of: chip offset value and sample offset value.

41. The system of claim 35 wherein said nodes are not synchronized.

42. The system of claim 35 wherein said nodes are synchronized as a function of information received from a satellite signal.

43. The system of claim 35 wherein said nodes are synchronized as a function of information transmitted from a component of said system.

44. The system of claim 35 including a network synchronization unit.

45. A method for estimating a location of an unknown Node B in a wireless communication system having a plurality of other nodes and a plurality of location measurement units ("LMU"), the method comprising:
(a) determining a first value based on a first network timing characteristic of the unknown Node B at a first LMU;
(b) determining a second value based on a second network timing characteristic of the unknown Node B at a second LMU;
(c) calculating one or more observed time difference of arrival ("OTDOA") hyperbolas based on at least the first and second values;
(d) determining a third value based on a third network timing characteristic of a known Node B at one of said first or second LMUs;
(e) determining a first timing offset value between the known and unknown Node Bs as a function of ones of the first, second and third values;
(f) determining a second timing offset value between the known and unknown Node Bs using a user equipment ("UE") network measurement report;
(g) determining a propagation delay from the known Node B to the LMU or UE as a function of the timing offset values;
(h) calculating one or more OTDOA hyperbolas based on ones of the first timing offset value, second timing offset value, third value, and propagation delay; and
(i) estimating a location of the unknown Node B as a function of said OTDOA hyperbolas.

* * * * *